United States Patent Office.

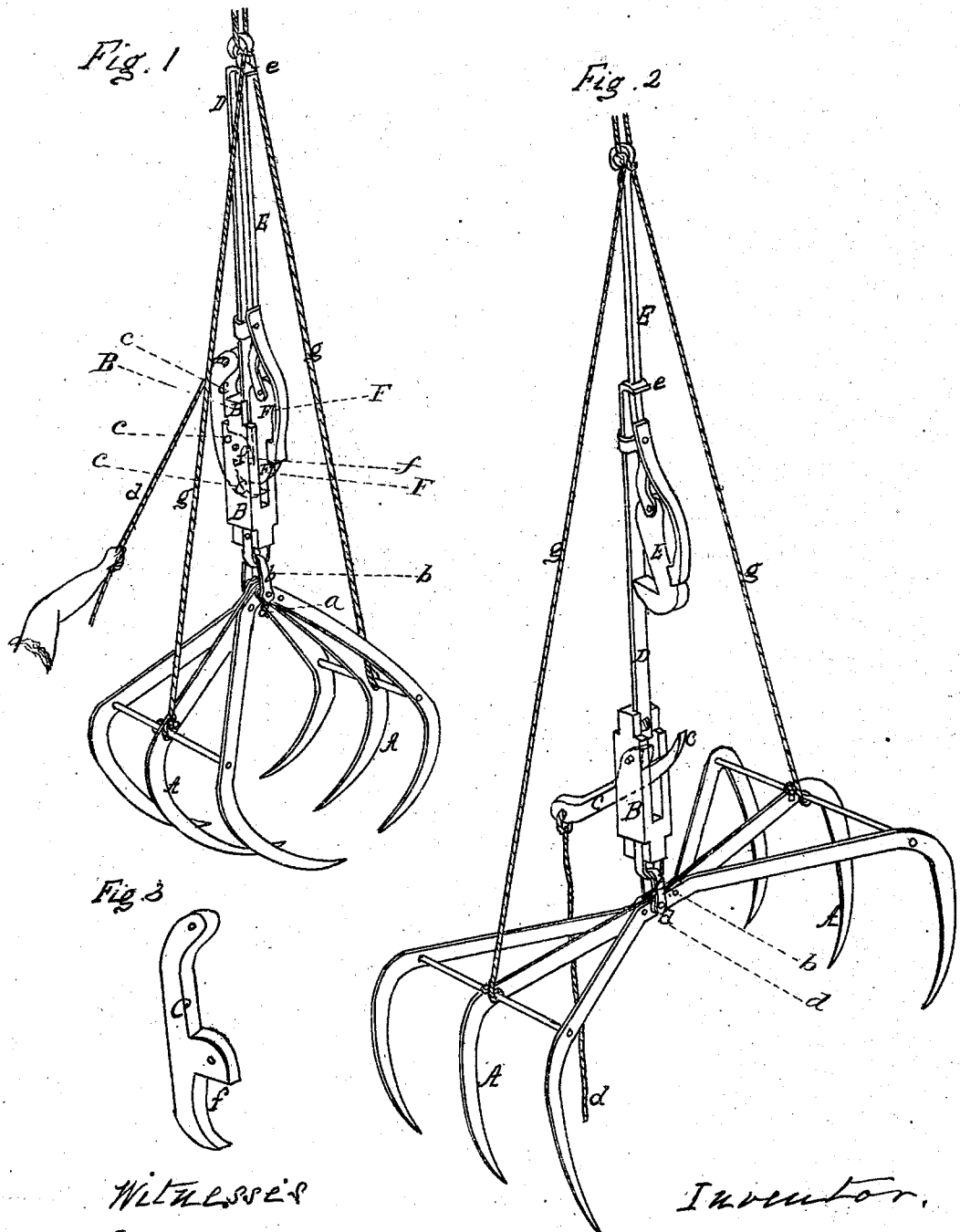

EMANUEL RABER, OF LAKE, OHIO.

Letters Patent No. 77,839, dated May 12, 1868.

---

IMPROVEMENT IN HORSE HAY-FORKS.

---

The Schedule referred to in these Letters-Patent and making part of the same.

---

TO ALL WHOM IT MAY CONCERN:

Be it known that I, EMANUEL RABER, of Lake, in the county of Stark, and State of Ohio, have invented certain new and useful Improvements in Hay-Forks; and I do hereby declare the following to be a full, clear, and exact description of the same, reference being had to the accompanying drawings, making a part of this specification, in which—

Figure 1 represents the hay-fork in question when holding and sustaining or raising its load or charge of hay, and Figure 2 represents its position when it has been tripped and has discharged its load.

Figure 3 represents, detached, the trigger by which the fork is held in the position shown in fig. 1, and tripped and allowed to open, as shown in fig. 2.

Similar letters of reference, where they occur in the separate figures, denote like parts of the apparatus in all of the drawings.

My invention relates to a hay-fork for raising large quantities of hay at a time, the tined or holding-jaws of which are locked when inserted into the hay or other article to be raised up by it, and which are tripped and drawn apart to discharge its load by the operator simply pulling a cord or line connected with a trigger.

To enable those skilled in the art to make and use my invention, I will proceed to describe the same with reference to the drawings.

The jaws or forks A A are in the form of grappling-jaws, and are pivoted together at $a$, so as to swing towards or from each other; and at $a$ is also hung a clevis, $b$, which unites these forks or jaws to a trigger-block, B, in which is pivoted, at $c$, the trigger C, which has a cord or line, $d$, connected to it, by which it may be operated.

To the block B is connected a bar, D, the upper end of which has a loop or guide, $e$, in it, through which a second bar, E, slides, said second bar E carrying a spring-hook, F, which, when in a certain position, as shown in fig. 1, is locked or held by the trigger $c$, the hook taking against the shoulder $f$ on said trigger.

To the upper end of the bar E is connected the rope by which the fork and its load are raised; and to this part of the bar E, viz, its upper end, are connected two cords, ropes, or lines $g\ g$, one extending to each of the pair of grappling-forks A A.

The operation of the fork is as follows:

In closing the forks upon the hay, the lines $g\ g$ draw down the bar E, and the spring-hook F, taking against the trigger $c$, locks itself there by running under the shoulder $f$ of the trigger, as shown in fig. 1.

The fork, with its load upon its tines, is now ready to be raised to any desired height, and when it is at the place where it is to be delivered or dropped, the operator simply pulls upon the cord $d$, which causes the trigger C to throw out the hook F, and the weight upon the forks causes them to drop, and in so doing the cords or lines $g\ g$, which are fastened to the bar E, which remains in its suspended position, draw the forks out of the load or charge of hay and allow it to drop.

Having thus fully described my invention, what I claim therein as new, and desire to secure by Letters Patent, is—

In combination with the pivoted forks A A, the trigger C, hook F, and lines or cords $g$, connecting said forks with the bar E, so that the forks may enter and hold and carry the load or charge of hay upon their tines, and drop it at the place of delivery, substantially as herein described and represented.

EMANUEL RABER.

Witnesses:
WM. M. CUNNINGHAM,
H. BAUCHMAN.